(12) United States Patent
Large et al.

(10) Patent No.: US 9,939,576 B2
(45) Date of Patent: Apr. 10, 2018

(54) PROVIDING STRUCTURAL SUPPORT VIA BACKLIGHT SYSTEM

(71) Applicant: Microsoft Technology Licensing, LLC, Redmond, WA (US)

(72) Inventors: Timothy Andrew Large, Bellevue, WA (US); Kurt A. Jenkins, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/008,333

(22) Filed: Jan. 27, 2016

(65) Prior Publication Data

US 2017/0212303 A1 Jul. 27, 2017

(51) Int. Cl.
*F21V 7/04* (2006.01)
*F21V 8/00* (2006.01)

(52) U.S. Cl.
CPC ......... *G02B 6/0093* (2013.01); *G02B 6/0051* (2013.01); *G02B 6/0053* (2013.01); *G02B 6/0055* (2013.01); *G02B 6/0061* (2013.01); *G02B 6/0065* (2013.01); *G02B 6/0083* (2013.01); *G02B 6/0088* (2013.01); *G02B 6/005* (2013.01); *G02B 6/0058* (2013.01)

(58) Field of Classification Search
USPC .................................................. 362/600–634
See application file for complete search history.

(56) References Cited

U.S. PATENT DOCUMENTS

| | | | |
|---|---|---|---|
| 6,033,604 A | 3/2000 | Lundin et al. | |
| 6,447,135 B1 | 9/2002 | Wortman et al. | |
| 7,473,023 B2 | 1/2009 | Chun et al. | |
| 8,098,347 B2 | 1/2012 | Brott et al. | |
| 8,322,874 B2 | 12/2012 | Ender | |
| 8,508,694 B2 | 8/2013 | Zhu | |
| 8,797,474 B2 | 8/2014 | Wurzel | |
| 9,116,267 B2 | 8/2015 | Franklin et al. | |
| 2002/0018341 A1* | 2/2002 | Torihara | G02B 6/005 362/601 |
| 2007/0058391 A1 | 3/2007 | Wilson et al. | |
| 2008/0285304 A1 | 11/2008 | Rankin, Jr. et al. | |
| 2010/0157623 A1 | 6/2010 | Tanahashi | |
| 2012/0147627 A1 | 6/2012 | Pan | |

(Continued)

FOREIGN PATENT DOCUMENTS

JP H1021720 A 1/1998
JP 2013093195 A 5/2013

OTHER PUBLICATIONS

"Application Brief I-003", Retrieved on: Nov. 4, 2015 Available at: http://www.avagotech.com/docs/5988-7057EN.

(Continued)

*Primary Examiner* — Daniel Hess
(74) *Attorney, Agent, or Firm* — Alleman Hall Creasman & Tuttle LLP

(57) ABSTRACT

Examples of structurally supportive backlight systems and devices incorporating such backlight systems are disclosed. One disclosed example provides a backlight system comprising a reflector, a light guide comprising a glass sheet, the glass sheet being adhered to the reflector with adhesive light extracting features, and a light source positioned to direct light into the light guide.

16 Claims, 3 Drawing Sheets

(56) References Cited

U.S. PATENT DOCUMENTS

| | | |
|---|---|---|
| 2013/0063978 A1 | 3/2013 | Gettemy et al. |
| 2014/0092632 A1 | 4/2014 | Greener et al. |
| 2014/0116607 A1 | 5/2014 | Chiu et al. |
| 2014/0133174 A1 | 5/2014 | Franklin et al. |
| 2015/0029435 A1 | 1/2015 | You et al. |
| 2016/0109637 A1* | 4/2016 | Teragawa ............ G02B 6/0055 349/65 |

OTHER PUBLICATIONS

ISA European Patent Office, International Search Report and Written Opinion Issued in PCT Application No. PCT/US2017/013627, dated Mar. 30, 2017, WIPO, 12 Pages.

* cited by examiner

PROVIDING STRUCTURAL SUPPORT VIA BACKLIGHT SYSTEM

BACKGROUND

An electronic display device may include a backlight system to provide light to a spatial light modulator, such as a liquid crystal display (LCD) panel. Such a backlight and display may be incorporated into a "hinge-up" portion of a laptop computing device, which is a portion that extends above a hinge of the laptop, as well as into other types of computing devices, such as tablets and smartphones.

SUMMARY

Examples of structurally supportive backlight systems and devices incorporating such backlight systems are disclosed. One disclosed example provides a backlight system comprising a reflector, a light guide comprising a glass sheet, the glass sheet being adhered to the reflector with adhesive light extracting features, and a light source positioned to direct light into the light guide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The subject matter of the present disclosure is now described by way of example and with reference to certain illustrated embodiments. It will be noted that the drawings included in this disclosure are schematic. Views of the illustrated embodiments are generally not drawn to scale, and the aspect ratio of some drawings may be purposely distorted to make selected features or relationships easier to see.

Backlighting systems for computing devices, including but not limited to laptop computers and tablet computers, may include one or more light sources that direct light into a molded polymer light guide that transmits the light to a display panel. Such backlighting systems also may include a reflector for directing light from the light guide to the display surface, one or more diffuser and recycling films, and potentially other components. Through the light guide, visible light may propagate laterally via internal reflection. The light guide may include a pattern of extraction features molded into the light guide to extract light from the light guide toward the reflector in suitably uniform intensity distribution for backlighting a display.

However, the configuration of such backlight systems may pose challenges to making a computing device thinner and lighter. For example, such backlight systems often include a rigid metal housing, which is located inside of the chassis of the computer display portion in an assembled computing device. This metal housing adds additional weight and thickness. Further, due to the difference in materials properties (such as coefficients of thermal expansion) of the light guide, the display panel (e.g. an LCD panel), and other structures of the computing device display, these components may not be rigidly fixed in the support structure, but instead loosely held within the metal housing, such that the components can "float" relative to one another and thereby thermally expand freely relative to one another. The resulting air gaps add additional thickness to the backlight system.

One potential way to reduce the weight and thickness of such a backlight system may be to omit the metal housing and mount the other structures (light guide, reflector, etc.) directly in the chassis of the computing device. However, omission of the metal housing would result in the loss of the rigidity provided by the metal housing. As such, the hinge-up portion of a laptop computer having such a backlight system may exhibit some flex when opened or closed. The term "display portion" may be used herein to refer to the hinge-up portion of a laptop, as well as the portion of a tablet computer, smartphone, or other portable device (e.g. a monitor with a tablet mode of use) that houses a display.

Figure 2:
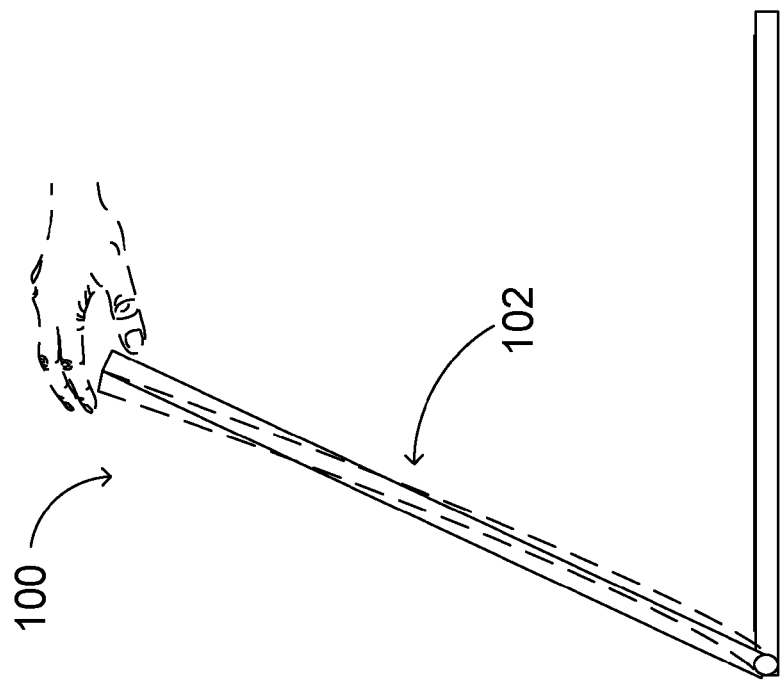
FIG. 2 schematically shows flexing of a display portion of an example computing system when the computing system is moved between an opened and closed position.
Figure 1:
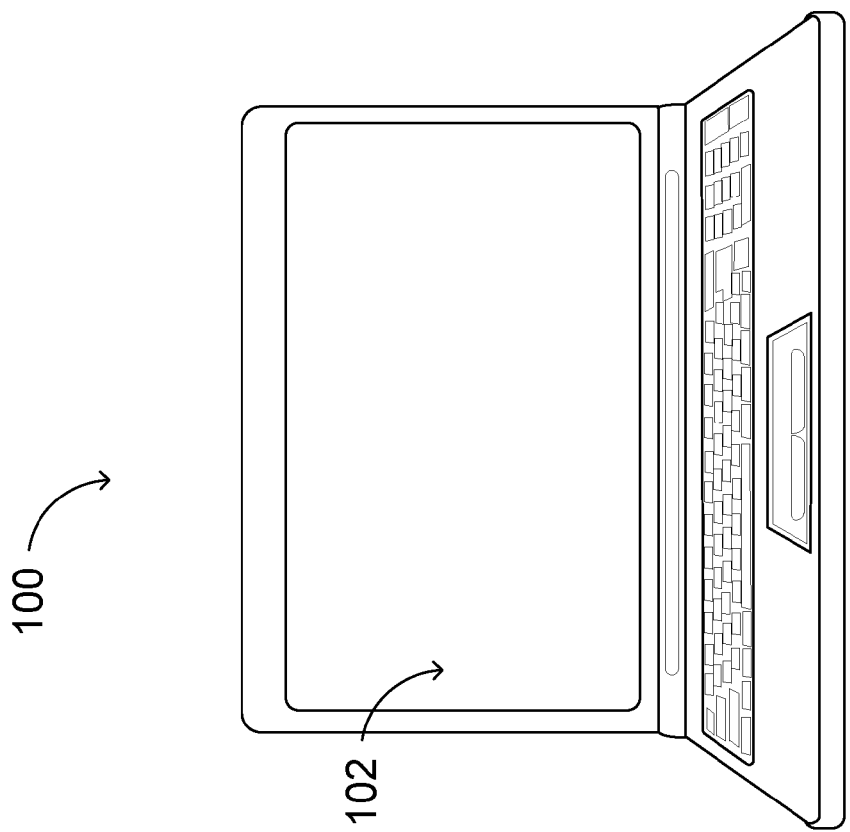
FIG. 1 shows an example computing system comprising a backlit display.

FIG. 1 illustrates an example laptop computer at 100. The display portion of the laptop computer 100 is shown at 102, and includes a display panel 104 and a backlight system (not shown in FIG. 1) positioned behind the display panel. FIG. 2 shows a side view of the laptop computer 100, and illustrates example flexing of the display portion 102 of the laptop computer 100 that may occur during opening/closing of the laptop computer if the rigid metal housing of such a backlight system is removed.

As one possible solution to this issue, to provide additional rigidity where the metal housing of the backlight system is omitted, another component of the backlight system may be made from a more rigid material. For example, the light guide may be formed from a rigid glass material. However, merely substituting a rigid glass light guide for a polymer light guide may not provide sufficient rigidity, as the air gaps between optical components, as well as the "floating" nature of the components relative to one another, may still allow flexing of the chassis and the backlight system to occur.

Thus, embodiments are disclosed that relate to adhering a rigid light guide to a reflector or other adjacent structure in a backlighting system to help provide structural rigidity to a computing device incorporating the backlight system. In some examples, the reflector is integrated with a rear chassis of the computing device. As such, adhering the light guide to the reflector provides support to help prevent bending of the rear chassis. Further, adhering the light guide to the reflector reduces a number of air gaps between backlight systems components, and thereby may help reduce the thickness of a computing device relative to one in which an air gap separates the light guide and reflector. Also, the adhesive used to bond the light guide to the reflector may be configured to extract light out of the light guide and toward the reflector. As such, the adhesive may be applied in a pattern configured to provide light of suitably uniform intensity to a display panel for image production. These and other features are described in more detail below.

Figure 3:
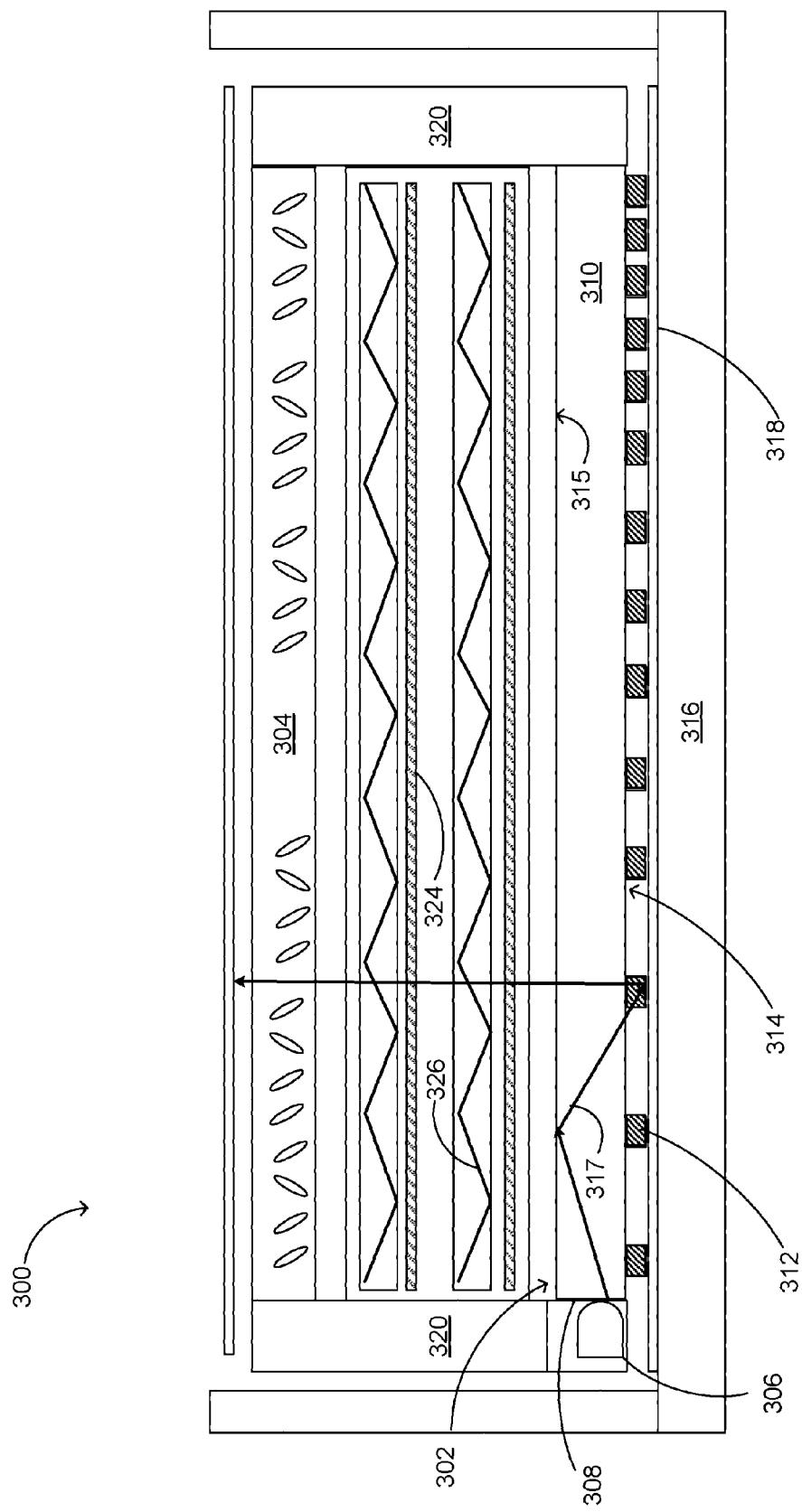
FIG. 3 is a schematic cross-sectional view of an example backlight system in accordance with the present disclosure.

FIG. 3 shows a schematic cross-sectional view of an example backlight assembly 302 for providing illumination for a display panel 304, such as an LCD panel, of a computing device. The backlight assembly 302 comprises a light source 306 arranged to provide light to a light guide 310 for illumination of the display panel 304. The light source 306 may comprise one or more light emitting diodes (LEDs) arranged along a light input interface 308 of the light guide 310, or may take any suitable form. The display panel 304 may include multiple layers of materials, such as polarizing layers, liquid crystal layers, etc., but is shown as a single layer herein for simplicity. Further, it will be understood that any other suitable display panel than an LCD panel may be used.

The light guide 310 is configured to conduct light received from the light source 306 via total internal reflection to distribute the light across a desired area for backlighting. The backlight system 302 further comprises an adhesive 312 arranged as an array of light extracting features on a first face 314 of the light guide to extract light from the light guide for display illumination. In the depicted example the extraction features formed from the adhesive 312 are illustrated as being positioned on a face of the light guide that faces the rear chassis 316 of a computing device 300, but in other examples may alternatively or additionally be positioned on an opposite side of the light guide 310. As described in more detail below, the extraction features may be formed from an adhesive that adheres the light guide 310 to an adjacent structure in the backlight system 302, such as the reflector 318. The combination of the light guide and array of light extracting features may be referred to collectively herein as a light guide system.

Light extracted by the extraction features is directed toward the reflector 318. The reflector 318 is configured to redirect the light extracted from the light guide 310 back through the light guide 310 and towards the display panel 304 for image generation. In the depicted example the reflector directs the light toward the display panel 304, as indicated by the light ray trace 317. As such, the reflector may include features (e.g. a saw tooth pattern, not shown) configured to reflect light in this direction. In other examples, separate reflector and turning films may be used to respectively direct light extracted from the light guide 310 back through the light guide 310, and to turn the reflected light toward the display panel 304.

The light guide may be formed from any suitable material. As mentioned above, light guides formed from some polymer materials may be relatively flexible, particularly where the light guides have a relatively thin profile for incorporation into a thin, lightweight computing device. Thus, such polymer light guides may not provide sufficient rigidity to the computing device to prevent the device from flexing. In view of this, in some examples the light guide may be formed from a glass material, such as a glass sheet. Any suitable glass material may be used. As one example, the light guide may be formed from a glass sold under the name GORILLA GLASS by Corning Incorporated of Corning, N.Y. In other examples, any other suitable glass material may be used. Further, other rigid materials also may be used, such as sapphire or silica (e.g. crystalline silica).

As mentioned above, the light guide 310 may be adhered to the reflector or other structure located adjacent to the light guide. This may help to increase the rigidity of a computing device incorporating the backlight system 302 without the use of a rigid metal canister enclosing the backlight system 302. Further, in some examples, the reflector 318 may be integrated with the rear chassis 316 of the computing system. For example, the reflector 318 may be laminated to an inner surface of the rear chassis 316, may be printed/painted/deposited onto the inner surface of the rear chassis 316, or may comprise a reflective surface of the rear chassis itself (e.g. where the rear chassis is formed from a reflective material, such as a white plastic material or metal material).

Any suitable adhesive may be used to adhere the light guide 310 to the reflector 318. In some examples, a curable adhesive may be used. In such examples, the adhesive may be deposited onto the reflector 318 or the light guide 310 in a suitable pattern. The light guide 310 and the reflector 318 may then be held in sufficiently close proximity for the adhesive to contact the surfaces of both parts, and the adhesive may be cured (e.g. via heat, UV light, and/or other suitable curing mechanism). Any suitable pattern may be used. For example, a pattern may be used in which an areal density of the light extracting features increases as a distance from a light input interface increases. Such a pattern may help to compensate for the lowering of the light intensity as light traveling away from the light sources is extracted.

In other examples, a thermoplastic adhesive may be used. In such examples, the thermoplastic adhesive may be applied at a sufficiently high temperature to allow the adhesive to be transferred onto the face of the light guide 310 or reflector 318. Then, the parts may be held in sufficiently close proximity for the adhesive to touch both surfaces, and the adhesive may be cooled to set the adhesive. The use of a thermoplastic adhesive also may allow the adhesive 312 to be applied on the light guide 310 or reflector 318 (which may more generally be referred to as light-directing components) in a desired light extracting pattern at one manufacturing step, and then cooled and stored or shipped for later backlight system assembly. At a later time, the adhesive 312 may be heated to soften the material, and then the light guide system and reflector may be adhered together. In yet other examples, a solvent-based adhesive may be used. In such an example, the adhesive may be hardened by evaporating the solvent, potentially in addition to the performance of a curing process.

The adhesive 312 further may be selected based upon various optical properties. For example, the adhesive may be selected to have a higher index of refraction than the light guide. Examples of suitable adhesives include, but are not limited to, epoxy resins, urethane resins, and glass frit.

Continuing with FIG. 3, the backlight system 302 further may include a rigid frame 320 that supports the components of the backlight system 302. In backlight systems that utilize a polymer light guide, the polymer light guide may have a significantly different coefficient of thermal expansion than the display panel of the device, as display panels (such as LCD panels) often utilize multiple layers of thin glass. Thus, in such devices, the polymer light guide and the display panel may be coupled to a frame on a single side to avoid thermally induced damage to either component. However, this may permit the backlight system to flex.

In contrast, the light guide 310 and the display panel 304 backlight system 302 each may be made from glass materials. As such, the materials may have sufficiently similar coefficients of thermal expansion to permit the light guide 310 and the display panel 304 each to be attached to the frame 320 on opposing sides. This structure may help to resist flexing. As such, when the light guide 310 is bonded to the reflector 318, the common attachment of the display panel 304 and the light guide 310 to the frame 320 may provide additional support against flexing. The frame 320 may be made from any suitable material. Examples include, but are not limited to, various metals and plastics.

The backlight system also may include various other components. For example, the backlight system may include one more diffuser films 324 and/or prism films 326. These films may be rigidly coupled to the frame, or loosely coupled to the frame 320, depending upon factors such as a similarity or difference of the coefficients of thermal expansion of these materials compared to the display panel 304 and/or the light guide 310. It will be understood that a backlight system according to the present disclosure may include additional components not shown herein and/or may omit various components described herein.

In backlight systems that utilize a polymer light guide coupled to a frame at one end, the light source may comprise a light emitting diode (LED) surface mounted to a printed circuit board, which is adhered to the polymer light guide in such a position as to place the LED against a light input interface of the light guide. However, the surface mounting of the LED to the light guide may be prone to rotational errors and other positional errors in the mounting process, such that an orientation of the LED relative to the light guide may not be flush. This may allow light to leak out of the LED without entering the light guide. Further, thermal expansion of the light guide may affect the positioning of the light source relative to the light guide. In contrast, the use of a rigid metal frame coupled to the light guide as disclosed herein may allow the light source to be mounted to the frame, rather than to the light guide. As such, a more precise and positionally stable placement of the light sources relative to the light guide may be achieved.

Figure 4:
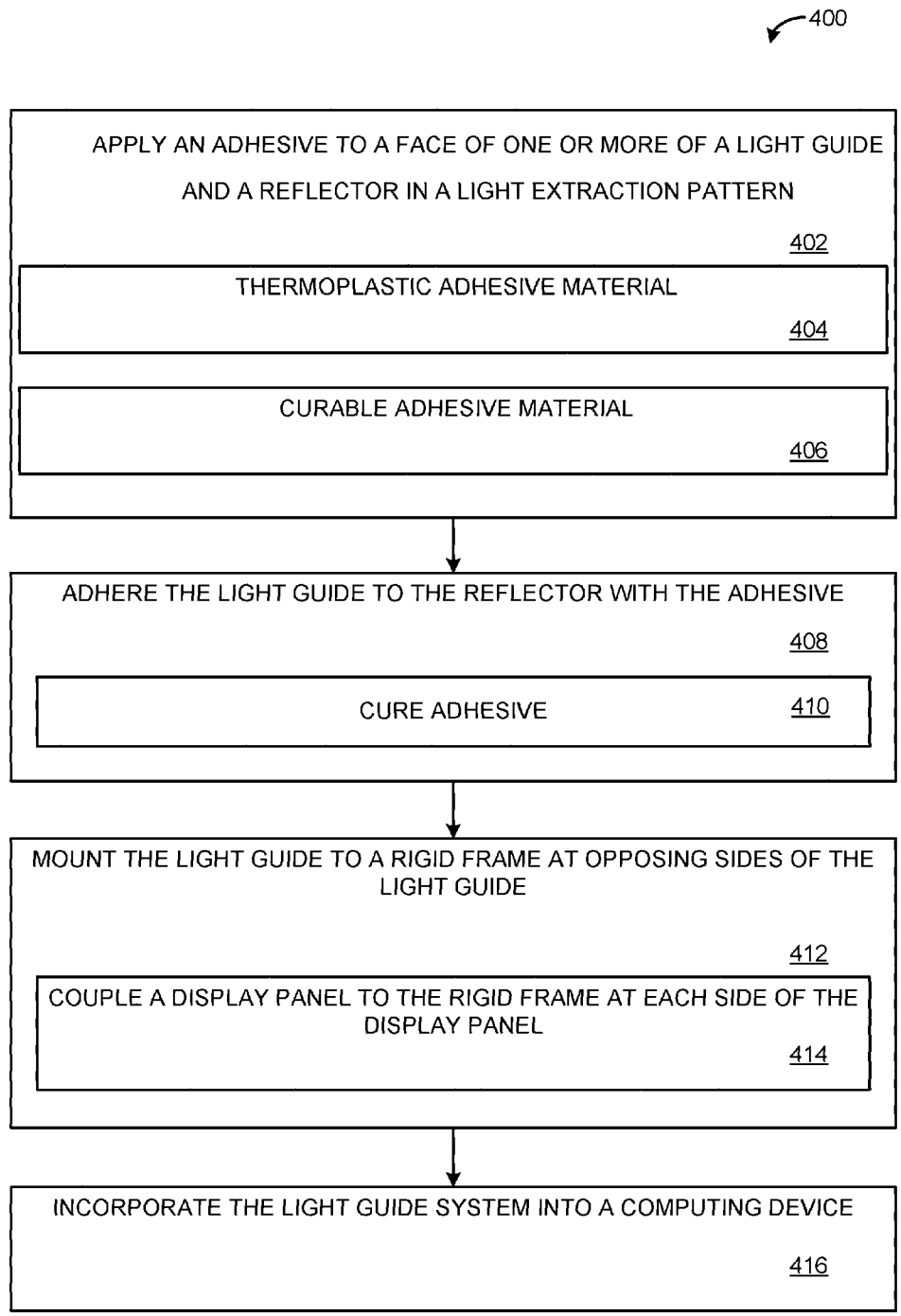
FIG. 4 shows an example method of manufacturing a backlight assembly in accordance with the present disclosure.

FIG. 4 shows an example of a method 400 of making a backlight assembly. Method 400 comprises, at 402, applying an adhesive to a face of one or more of a light guide and a reflector in a light extraction pattern. Any suitable pattern may be used. For example, the pattern may have a lower density of extraction features at a region configured to be located closer to a light source, and a higher density of extraction features at a region configured to be located farther from the light source, to compensate for the reduction in light intensity due to extraction as the light travels within the light guide farther from the light source. Likewise, any suitable adhesive may be used. For example, as indicated at 404, the adhesive may be a thermoplastic material. Such an adhesive may be used, for example, where the extraction pattern is applied to the light guide and/or the reflector at a different facility than where the light guide and/or the reflector is incorporated into a display device. In such examples, the adhesive may be softened by heating when it is to be installed in a display device, and then cooled to form the adhesive bond. In other examples, as indicated at 406, a curable adhesive may be used. In yet other examples, a solvent-based adhesive that is hardened by evaporation, or a glass frit, may be used.

The adhesive may have any suitable optical properties. For example, the adhesive may have an index of refraction having a value higher than that the light guide material.

Method 400 further comprises, at 408 adhering the light guide to a reflector with the adhesive. In some examples, the reflector may be integrated with a rear chassis of a computing device, while in other examples the reflector may be a separate part from the rear chassis that is fixed to the rear chassis in a separate step. Method 400 may further comprise, at 410, curing the adhesive after contacting the adhesive to the reflector. Any suitable method may be used to cure the adhesive, depending upon the adhesive used. Examples include ultraviolet light curing and thermal curing. In other examples, a thermoplastic adhesive may be softened prior to applying the adhesive and contacting the adhesive to the reflector, and then cooled to adhere the light guide to the reflector. In yet other examples, a solvent-based adhesive may be hardened by evaporating the solvent. In any of these examples, the light guide may be adhered to the reflector either before or after performing other backlight system assembly steps.

Method 400 further comprises, at 412, mounting the light guide to a rigid frame at opposing sides of the light guide. As mentioned above, this may be performed either before or after adhering the light guide to the reflector, and either before after assembling other components of the backlight system, The method further comprises at 414 coupling a display panel to the rigid frame at each side of the display panel, and at 416, incorporating the assembled light guide system into a computing device.

The examples described herein may permit the construction of a thinner, lighter display device while maintaining a suitable amount of rigidity via a backlight system, even where a metal canister enclosing the backlight system is omitted. It will be understood that the configurations and/or approaches described herein are presented for example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example provides a backlight system comprising a reflector, a light guide comprising a glass sheet, the glass sheet being adhered to the reflector with adhesive light extracting features, and a light source positioned to direct light into the light guide. In some examples, the the reflector may alternatively or additionally be integrated with a back chassis structure of the system. In some examples, the light guide may alternatively or additionally be coupled to a rigid frame at each side of the glass sheet. In some examples, the rigid frame may alternatively or additionally be coupled to a display panel at opposing sides of the display panel. In some examples, the backlight system may alternatively or additionally include one or more of a prism sheet and a diffuser coupled to the rigid frame. In some examples, the backlight system may alternatively or additionally include one or more light sources supported by the rigid frame. In some examples, the adhesive light extracting features may alternatively or additionally be formed from an adhesive having an index of refraction higher than an index of refraction of the glass forming the light guide.

Another example provides a light guide system for a backlight system, the light guide system comprising a light-directing component, and an array of light extracting features arranged on the light-directing component, the array of light extracting features comprising light extracting features formed from an adhesive configured to be adhered to an adjacent structure in a backlight system. In some examples, the light directing component may alternatively or additionally include a glass light guide. In some examples, the light directing component may alternatively or additionally include a reflector configured to receive light from a light guide. In some examples, an areal density of the light extracting features may alternatively or additionally increase as a distance from a light input interface increases. In some examples, the light extracting features may alternatively or additionally comprise one or more of a thermoplastic adhesive material and an adhesive material. In some examples, the light extracting features may alternatively or additionally comprise an adhesive material with index of refraction higher than an index of refraction of the glass forming the light guide.

Another example provides a method for manufacturing a backlight system. The method comprises applying an adhesive to a face of one or more of a glass light guide and a reflector in a pattern configured to provide extraction of light from the glass light guide in an area configured for illumination of a display panel, and adhering the light guide to the reflector with the adhesive. In some examples, the method may alternatively or additionally comprise mounting the light guide to a rigid frame at each side of the light guide. In some examples, the method may alternatively or additionally comprise coupling a display panel to the rigid frame at each side of the display panel. In some examples, applying the adhesive may alternatively or additionally comprise applying a thermoplastic adhesive. In some examples, applying the adhesive may alternatively or additionally comprise applying a curable adhesive. In some examples, applying the adhesive may alternatively or additionally comprise applying the adhesive in a pattern with an areal density of light extracting features that increases with increasing distance from the light source. In some examples, adhering the light guide to a reflector with the adhesive may alternatively or additionally comprise adhering the light guide to a back chassis having an integrated reflector.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device comprising:
   a display panel;
   a rigid frame attached to the display panel on opposing sides of the display panel;
   a rear chassis; and
   a backlight system configured to provide light to the display panel, the backlight system comprising
      a reflector integrated with the rear chassis,
      a light guide comprising a glass sheet, the light guide being adhered to the reflector with adhesive light extracting features to rigidly couple the light guide with the rear chassis to resist flexing of the rear chassis, and the light guide being attached to the rigid frame on opposing sides of the light guide such that the attachment of the light guide and the display panel to the rigid frame provides additional support against flexing, and
      a light source mounted to the frame and positioned to direct light into the light guide.

2. The display device of claim 1, wherein the reflector comprises a reflective inner surface of the rear chassis.

3. The display device of claim 1, wherein the reflector comprises a material laminated to the rear chassis.

4. The display device of claim 1, further comprising one or more of a prism sheet and a diffuser rigidly coupled to the rigid frame.

5. The display device of claim 1, further comprising two or more light sources mounted to the rigid frame.

6. The display device of claim 1, wherein the adhesive light extracting features are formed from an adhesive having an index of refraction higher than an index of refraction of the glass forming the light guide.

7. A display device, comprising
   a display panel;
   a rigid frame attached to the display panel on opposing sides of the display panel;
   a rear chassis; and
   a light guide system configured to provide light to the display panel, the light guide system comprising
      a light-directing component integrated with the rear chassis,
      a light guide formed from a glass sheet, the light guide being attached to the rigid frame on opposing sides such that the light guide, the rigid frame, and the display panel form a rigid structure, and
      an array of light extracting features formed from an adhesive material and adhering the light-directing component to the light guide to rigidly couple the light guide with the rear chassis.

8. The display device of claim 7, wherein the light-directing component comprises a reflector configured to receive light from the light guide.

9. The display device of claim 7, wherein an areal density of the light extracting features increases as a distance from a light input interface increases.

10. The display device of claim 7, wherein the light extracting features comprise one or more of a thermoplastic adhesive material and an adhesive material.

11. The display device of claim 7, wherein the light extracting features comprise an adhesive material with index of refraction higher than an index of refraction of the glass forming the light guide.

12. A method for manufacturing a display device, the method comprising:
   applying an adhesive to a face of one or more of a glass light guide and a reflector in a pattern configured to provide extraction of light from the glass light guide in an area configured for illumination of a display panel, the reflector being integrated with a rear chassis;
   adhering the light guide to the reflector with the adhesive to rigidly couple the light guide with the rear chassis;
   attaching the light guide to a rigid frame on opposing sides of the light guide; and
   attaching a display panel to the rigid frame on opposing sides of the display panel such that the attachment of the light guide and the display panel to the rigid frame provides additional support against flexing.

13. The method of claim 12, wherein applying the adhesive comprises applying a thermoplastic adhesive.

14. The method of claim 12, wherein applying the adhesive comprises applying a curable adhesive.

15. The method of claim 12, wherein applying the adhesive comprises applying the adhesive in a pattern with an areal density of light extracting features that increases with increasing distance from the light source.

16. The method of claim 12, wherein adhering the light guide to a reflector with the adhesive comprises adhering the light guide to an inner surface of the rear chassis.

* * * * *